(12) United States Patent
Guenthner et al.

(10) Patent No.: US 6,230,196 B1
(45) Date of Patent: May 8, 2001

(54) GENERATION OF SMART HTML ANCHORS IN DYNAMIC WEB PAGE CREATION

(75) Inventors: Timothy John Guenthner; Francis Daniel Lawlor; Dah-Haur Lin; Charles Rudolph Schmitt, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/968,521

(22) Filed: Nov. 12, 1997

(51) Int. Cl.$^7$ ............................ G06F 15/16; G06F 15/173
(52) U.S. Cl. ........................ 709/223; 709/218; 709/246
(58) Field of Search .................................. 709/203, 216, 709/217, 218, 219, 246, 223, 224; 707/10; 345/329, 333, 335; 340/825

(56) References Cited

U.S. PATENT DOCUMENTS

| | | | |
|---|---|---|---|
| 5,740,371 | * | 4/1998 | Wallis .................................. 709/229 |
| 5,754,830 | * | 5/1998 | Butts et al. ........................... 395/500 |
| 5,774,668 | * | 6/1998 | Choquier et al. .................... 709/223 |
| 5,787,416 | * | 7/1998 | Tabb et al. ............................... 707/2 |
| 5,812,780 | * | 9/1998 | Chen et al. ........................... 709/224 |
| 5,867,706 | * | 2/1999 | Martin et al. ........................ 709/105 |
| 5,894,554 | * | 4/1999 | Lowery et al. ........................ 707/10 |

* cited by examiner

*Primary Examiner*—Zarni Maung
*Assistant Examiner*—Jason D. Cardone
(74) *Attorney, Agent, or Firm*—Jeffrey S. LaBaw; David H. Judson

(57) ABSTRACT

A method of dynamically generating a Web page at a Web server in response to an HTTP request from a Web client in a computer network. The Web page has a hypertext reference identifying a linked page supported on each of a set of other servers in the computer network. In response to the request, a given one of the set of other servers is identified based on some given criteria, e.g., shortest access time, lightest current load, or the like. Information identifying a path to the identified other server is then inserted into the hypertext reference as the Web page (including the hypertext reference) is returned to the Web client in response to the request. Thus, if the hypertext reference is later activated by the user browsing the returned Web page, the linked page is preferentially served from the identified other server.

28 Claims, 3 Drawing Sheets

GENERATION OF SMART HTML ANCHORS IN DYNAMIC WEB PAGE CREATION

BACKGROUND OF THE INVENTION

1. Technical Field

The present invention relates generally to client-server computing over a computer network such as the Internet and, in particular, to a method for dynamically generating Web pages at a Web server in response to received HTTP requests.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL.

When the user of the browser specifies a link, the client issues a request to a naming service to map a hostname (in the URL) to a particular network IP address at which the server is located. The naming service returns a list of one or more IP addresses that can respond to the request. Using one of the IP addresses, the browser establishes a connection to a server. If the server is available, it returns a Web page.

To facilitate further navigation, a Web page typically includes one or more hypertext references known as "anchors" or "links". In HTML, each anchor is commonly delineated by a markup language "tag" set "<A href "pathname"></a>", where "pathname" is the path information identifying the location of the linked page or object. A <href> tag, however, may identify a server that no longer supports the object content or is otherwise performing poorly against a given metric. If the user later activates the link, he or she may not be able to navigate to the desired location, or such navigation may be unacceptably slow.

It would be highly desirable to be able to assure a user that, when a given Web page is returned from a Web server, the anchor references are valid at that time. The present invention provides a solution to this problem.

SUMMARY OF THE INVENTION

It is a primary object of this invention to dynamically generate a Web page at a Web server in response to a client request so that links in the generated page are as up-to-date as possible.

It is another primary object of this invention to generate a Web page at the Web server in a manner that attempts to ensure that subsequent navigation from the page is optimized.

It is still another object of this invention to provide "intelligent" Web page generation from a Web server wherein the Web server receives and maintains information about the availability of other servers in the network that support resources required by the Web page.

Still another object of this invention is to enhance a Web server HTML page generator by having the Web server cache and use third party server availability information during page generation.

Yet another more general object of this invention is to enhance Web page creation at a Web site.

Another more general object of this invention is to ensure optimal access to Web-based information from a client machine that retrieves a Web page created by the intelligent HTML page generator.

These land other objects are provided in a method of dynamically generating a Web page at a Web server in response to an HTTP (or other such) request from a Web client in a computer network. The Web page has a hypertext reference identifying a linked page or other required resource supported on each of a set of other servers in the computer net work. In response to the HTTP request, a given one of the set of other servers is identified based on some given criteria, e.g., shortest access time, lightest current load, or the like. Information identifying a path to the identified other server is then inserted into the hypertext reference as the Web page (including the hypertext reference) is returned to the Web client in response to the request. Thus, if the hypertext reference is later activated by the user browsing the returned Web page, the linked page is preferentially served from the identified other server.

According to an embodiment of the invention, an "intelligent" Web server comprises a processor, an operating system, and a means for dynamically generating a Web page in response to a Web client request, the Web page having a hypertext reference identifying a linked page supported on each of a set of other servers in the computer network. The generating means may be a computer program. Preferably, the generating means comprises means responsive to the Web client request for identifying one of the set of other servers that satisfies a given criteria. The generating means also includes means responsive to the identifying means for inserting into the hypertext reference information identifying a path to the identified other server. The server further includes means for returning the Web page including the hypertext reference (and the path information) to the Web client in response to the request. Thus, in the event the hypertext reference is later activated by a user browsing the retrieved page, an attempt is first made (by the client machine browser) to retrieve the linked page from the identified other server.

According to still another aspect of the invention, an "intelligent" Web page is generated according to a given HTML page generation method. The Web page includes a hypertext reference identifying a linked page or other required resource supported on each of a set of other servers in the computer network. The method begins in response to a request from a client for the Web page. In response to the request, one of the other servers supporting the linked page is selected based on a given criteria. Information identifying a path to the selected other server is then inserted into the hypertext reference.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
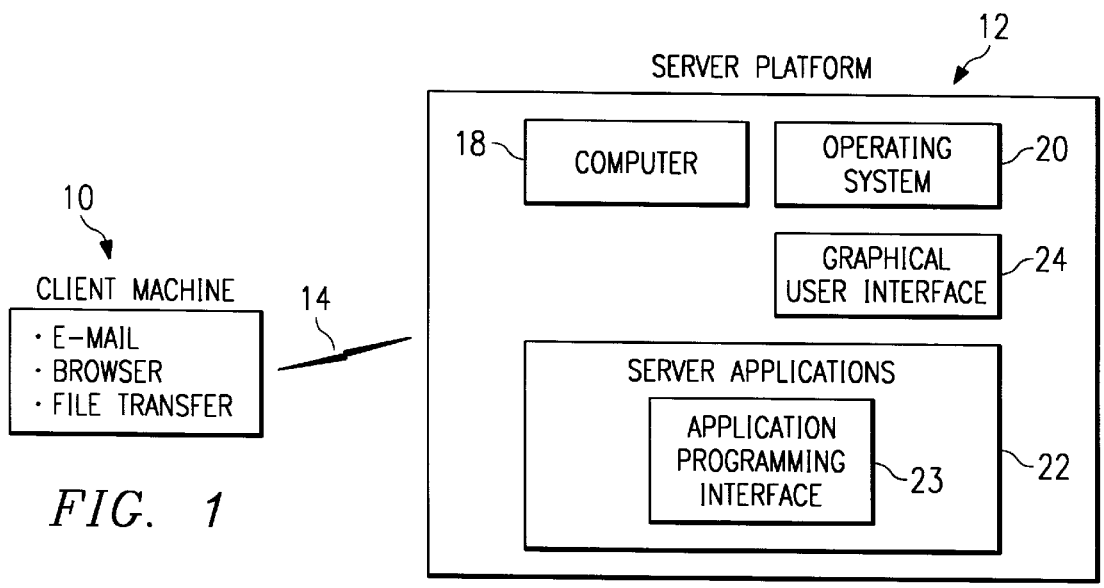
FIG. 1 is a representative system in which the present invention is implemented.

A representative system in which the present invention is implemented is illustrated in FIG. 1. A client machine 10 is connected to a Web server platform 12 via network 14. For discussion purposes, network 14 is the Internet, an intranet, an extranet or any other known network. Web server platform 12 is one of a plurality of servers which are accessible by clients, one of which is illustrated by machine 10. A representative client machine includes a browser 16, which is a known software tool used to access the servers of the network. The Web server platform supports files (collectively referred to as a "Web" site in the form of hypertext documents and objects. In the Internet paradigm, a network path to a server is identified by a so-called Uniform Resource Locator (URL).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Server Version 2.0, that supports interface extensions. The platform 12 also includes a graphical; user interface (GUI) 24 for management and administration. The Web server 18 also includes an Application Programming Interface (API) 23 that provides extensions to enable application developers to extend and/or customize the core functionality thereof through software programs commonly referred to as "plug-ins" or "helper" applications.

A representative Web client is a personal computer that is x86-, PowerPC®- or RISC-based, that includes an operating system such as IBM® OS/2® or Microsoft Windows 95, and that, includes a browser, such as Netscape Navigator 3.0 (or higher), having a Java Virtual Machine (JVM) and support for application plug-ins or helper applications.

Figure 2:
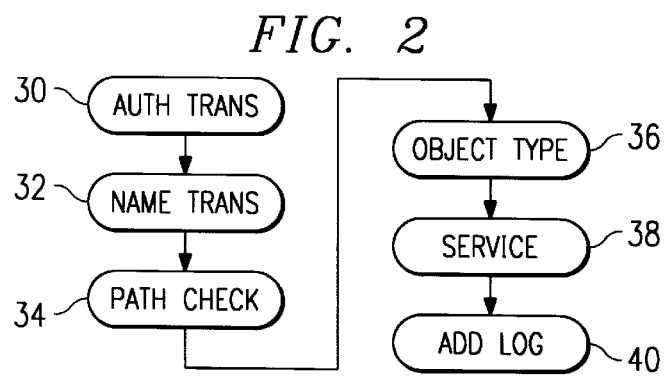
FIG. 2 is a flowchart illustrating the conventional processing associated with an HTTP request from the Web client to the Web server shown in FIG. 1.

The Web server accepts a client request and returns a response. The operation of the server program 22 is governed by a number of server application functions (SAFs), each of which is configured to execute in a certain step of a sequence. This sequence, illustrated in FIG. 2 by way of background only, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

It is known in the art to generate HTML pages dynamically in response to Web client requests received at the Web server. A typical Web client request is an HTTP GET request. In prior art page generation techniques, however, links are included in the HTML page without regard or consideration as to whether such links represent active or efficient servers. Thus, when the user (browsing the page at a client machine) later activates one such link, he or she may be navigated to an inactive or inefficient server. The present invention overcomes this problem by generating an HTML page "on the fly" so as to include "up-to-date" link information about resources required by the page links.

Figure 3:
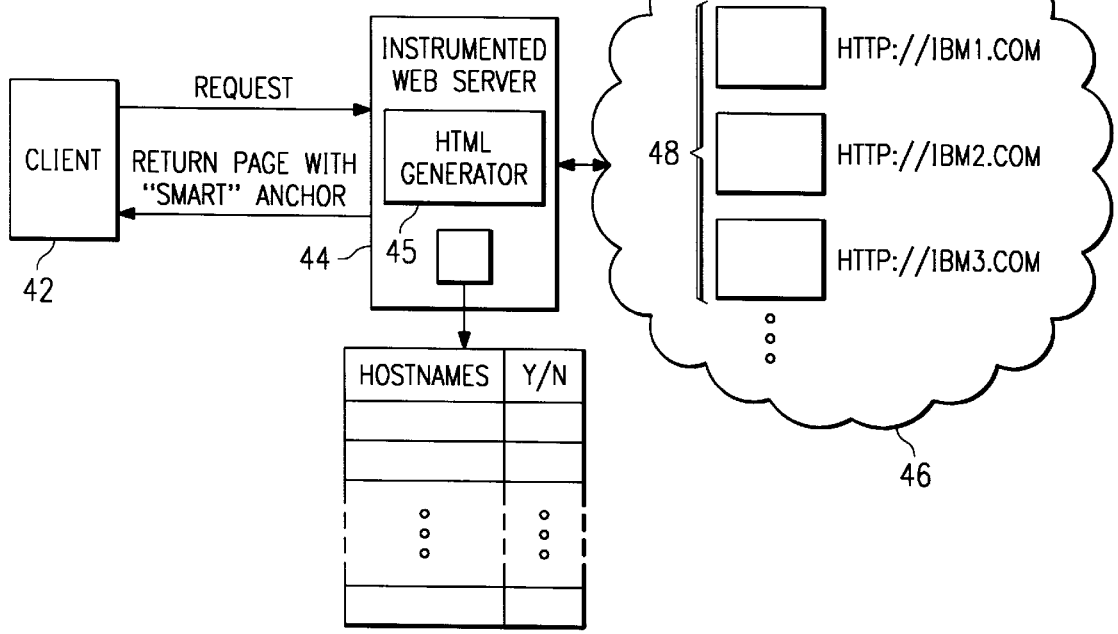
FIG. 3 illustrates the preferred embodiment of the present invention implemented in a computer network.

FIG. 3 illustrates the basic operation of this invention. In the preferred embodiment, a Web client 42 is connectable to a Web server 44 that supports the inventive HTML generator 45. Web server 44 is also connected in a network 46 in which there is a collection of other servers 48. Each of the servers 48 theoretically support a resource (e.g., a linked page or other object) required of a Web page to be served by the Web server 44. Network 46 may be the Intranet, an intranet, and extranet or the like. At a given moment (or during a given time period), some of the servers 48 may or may not be available to service (or capable of servicing) the client should the user of the client (after receiving the Web page) desire to obtain the requested resource (by activating the link).

According to the invention, when the client 42 initially requests the page from the Web server 44, the HTML generator 45 determines the most appropriate host or provider for at least one resource required by the page. A page of HTML is then returned to the client with the "smart" anchor pointing to the most appropriate host. The generated URL in the page then has the following representative form:

<a href http://"best host"/<requested resource>>/a>.

The "best host" includes path information which the client machine browser then uses to pull the requested resource (if the link is later activated or selected).

Although the network in FIG. 3 assumes a homogenous environment, this is not a requirement of the invention. Moreover, although not shown in detail, a background process running in the server 44 preferably maintains a mapping of required resources to servers and their respective availability. This mapping is cached in the server platform and then accessed each time an instrumented Web page is to be generated. Further details concerning the mapping scheme are set forth in copending application Ser. No. 08/977,636, titled "Mapping Web Server Objects To TCP/IP Ports To Facilitate Routing Of HTTP Requests", which application is assigned to the assignee of the present invention. That application is incorporated herein by reference.

Figure 4:
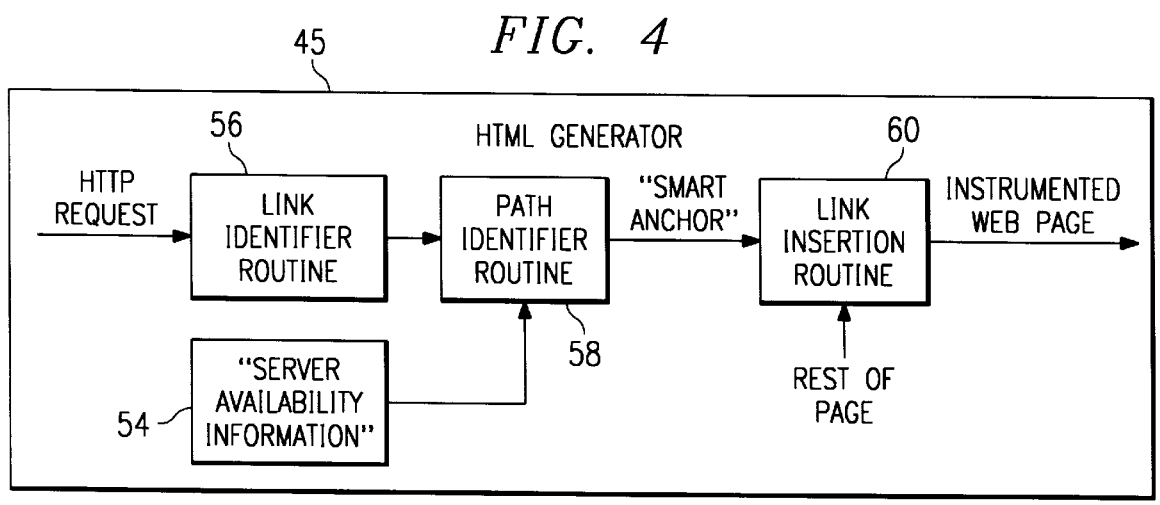
FIG. 4 is a block diagram of the HTML page generator of the Web server according to the present invention.

A more detailed block diagram of the dynamic HTML generator 45 is shown in FIG. 4. Dynamic HTML generator is preferably implemented in software running on a computer comprising the Web server platform. As noted above, the generator 45 functions generally to insert network path information into at least one link of a HTML page then being generated in response to the HTTP request. Generator 45 may also insert other information, such as a timestamp or control data, that may be parsed by the browser. This network path information is preferably optimized so as to provide some requisite degree of assurance regarding the operational state or conditions at the server hosting the resource identified by the link (sometimes referred to as the "linked" page or object). Thus, when an "instrumented Web page" is generated by the generator 45, there is a higher assurance that the user browsing that page will be able to navigate to the linked page or object in an efficient and cost-effective manner. The instrumented Web page may carry a "seal" or other statement that verifies its status in this regard and that, optionally, may be displayed to the user. Thus, the generator 45 provides optimal access to Web-based information that has not heretofore been possible with known HTML page generation techniques.

HTML generator 45 includes a storage 54 in which "server availability" information is cached. Server availability information is information obtained from various sources in the network preferably describing one or more operating characteristics of the set of "servers" that support linked pages and objects (namely, the required resources). One source of the server availability information may be the servers themselves, with each server broadcasting its "availability" in some known manner. Or, availability of a particular server may be obtained by a background process running in the Web server whose task involves maintaining a current mapping of all requested resources as has been previously described. The background process may query each server of the set on a periodic basis to determine whether the server is otherwise available (and to what extent). The particular manner in which the server availability information is obtained and cached at the Web server may be quite varied.

In a representative example, the server availability information is information about a set of "mirrored" servers that each support at least one linked page required by the HTML page then being generated by the generator 45. The HTML generator 45 receives a given HTTP request and parses this request through a link identifier routine 56 and a path identifier routine 58.

In particular, link identifier routine 56 receives the HTTP request from the client and determines which "links" are present in the requested document. These links are passed to the path identifier routine, which also receives the server availability information as an input. For each link for which server availability information exists, the path identifier routine 58 selects a given one of the set of servers that support the linked page or object based on given evaluation criteria. The resulting path information is then inserted into the link by a insertion routine 60 as the HTML for the page is being generated.

When the Web page (as generated) is returned to the client machine that issued the HTTP request, the anchor includes path information to the server that has satisfied the evaluation criteria. Preferably, this information is current enough so that when the user subsequent activates the link, the linked page or object is returned from the selected server in an efficient manner.

The evaluation criteria will be quite varied and will depend on the particular type of server availability information that is or may be currently supplied and cached by the HTML generator. The selection process may simply test to determine whether the resource is available on each of the candidate servers. In such case, the evaluation criteria would be a simple Yes/No determination as to availability. Another representative criteria is a then-current "access time" of each server supporting the linked page or object. In this case, the evaluation criteria would select the particular server of the set that has a "shortest" access time (all other network communication costs being substantially equal). In another representative example, the evaluation criteria may be that one particular server has a then-current "load" less than a load of at least some of the other servers in the set. In such case, the path information inserted into the link would direct the user's browser to the least-loaded server. In yet another example, the given evaluation criteria may be the then-current availability of each of the servers in the set based on a location of each server in the computer network relative to the client. In this example, the evaluation criteria causes the selection of the server that can be reached in the least amount of time.

Of coarse, one of ordinary skill will appreciate that the give criteria described above is merely representative. The given criteria may merely remove from consideration those servers that are no longer available (e.g., for organizations that have gone out of business or otherwise no longer support a Web site). A particular evaluation criteria may be based on one or more thresholds. Thus, for example, a default rule would select a particular candidate server based on the server's access time, but if a particular HTTP request pushed the server over a given other (e.g., load) threshold, then a next server would be chosen, and so forth. Of course, any combination of the above examples may be used, or it may be desired to implement ether types of evaluation criteria.

Figure 5:
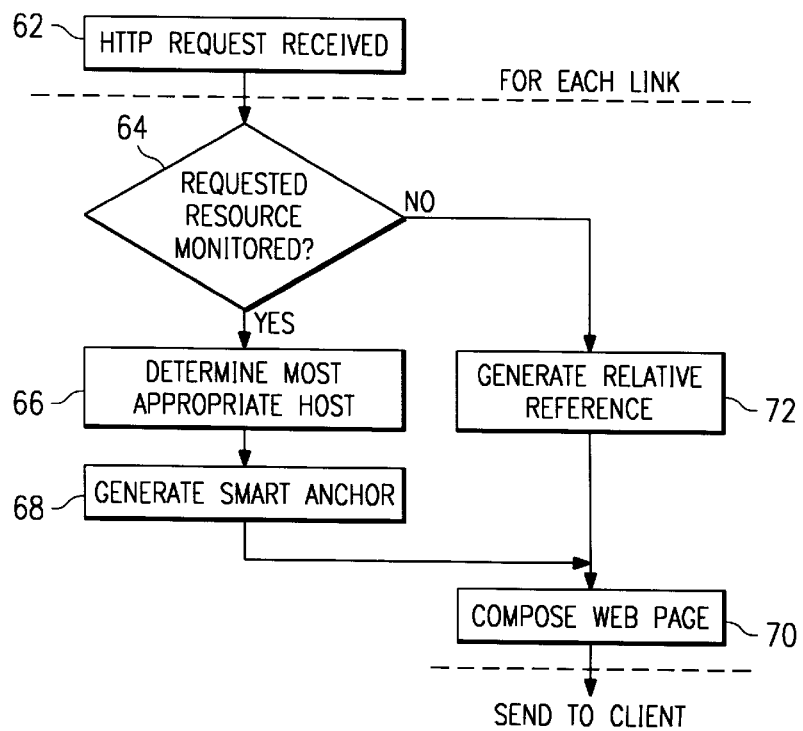
FIG. 5 is a flowchart of a preferred method for dynamically generating a Web page implemented by the HTML page generator.

A flowchart illustrating the preferred HTML generation routine is shown in FIG. 5. It begins at step 62 in response to receipt of the HTTP request from the Web client. The request seeks an HTML document having a link to a requested resource (e.g., a linked page or object). At step 64, a test is performed to determine whether the requested resource is a monitored resource (e.g., a database, applet, or the like). If the outcome of the test at step 64 is positive, the routine continues at step 66 to determine the most appropriate host from which the resource should be obtained. At step 68, the routine generates the hypertext reference with the path information pointing to the most appropriate host. The routine then continues at step 70 to compose the Web page for return to the client. Step 70 may be implemented with any conventional HTML page generation process.

An alternative processing occurs if the outcome of the test at step 64 is negative. In particular, the routine generates a standard relative reference to the resource (based on information otherwise available) with respect to the requested document. The routine then continues at step 70 to generate the page as previously described. Thus, if the requested resource is not being monitored, the HTML generator merely "fills in" the standard path information that is otherwise available to the server. One of ordinary skill will further appreciate that steps 64, 66, 68 and 70 may be carried out for each link in the requested HTML page, or at least for some of the links.

Figure 6:
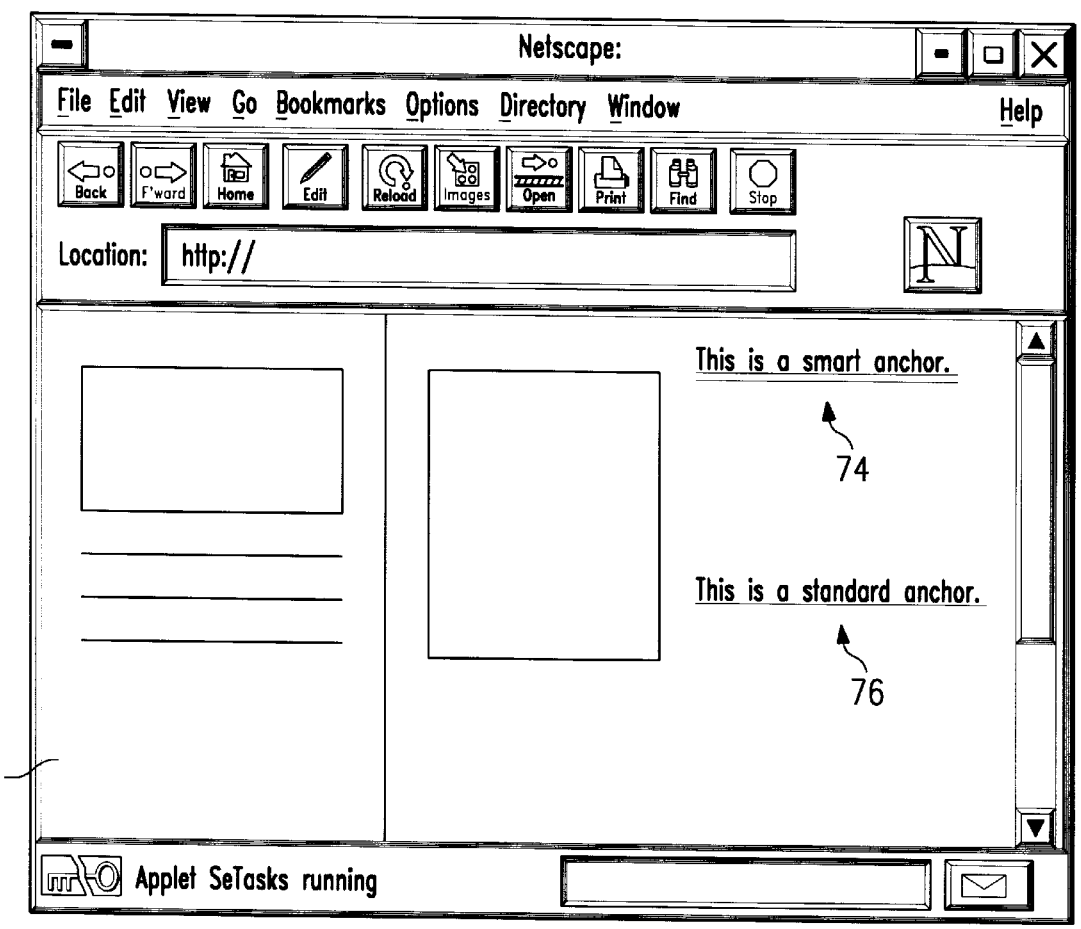
FIG. 6 is a representative Web page generated by the HTML page generator.

FIG. 6 illustrates a representative Web page 72 returned to the client and displayed by the browser. Web page 72 includes at least one "smart" link 74, and one or more other conventional links 76. The smart link 74 is served by one of a set of candidate servers that has been selected or identified (by the HTML generator) as capable of serving the object of the smart link. Thus, the smart link carries (or may carry) an indication that the anchor reference is valid at least at the time the page was created. To this end, the link may have a special color or highlight when it is displayed on the browser. This status is distinguished from that of the conventional link 76.

Thus, according to the present invention, a particular Web page is generated with at least one smart HTML anchor. There are a set of servers that support the object referenced, by the smart HTML anchor, and the particular link is preferably based on the relative availability of one of the servers in the set.

One of the preferred implementations of the invention is as a set of instructions (program code) in a code module resident in the random access memory of a Web server computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims:

What is claimed is:

1. A method of generating a document formatted according to a hypertext language implemented at a given server in a computer network, the document having a hypertext reference identifying a linked object supported on each of a set of other servers in the computer network, comprising the steps of:
   in response to a request from a client for the document, dynamically selecting one of the other servers of the set based on a given criteria indicating that the linked object is then available for retrieval from the selected other server;
   inserting into the hypertext reference information identifying a path to the selected other server; and
   returning the document including the hypertext reference to the client in response to the request.

2. The method as described in claim 1 wherein the given criteria is evaluated against status information about the set of other servers maintained at the given server.

3. The method as described in claim 2 wherein the selected other server has a then-current availability, based on a location of the selected other server in the computer network relative to the client, that is greater than at least some of the other servers in the set.

4. The method as described in claim 3 wherein the request is an HTTP request.

5. The method as described in claim 2 wherein the selected other server has a then-current access time less than an access time of at least some of the other servers in the set.

6. The method as described in claim 2 wherein the selected other server has a then-current load less than a load of at least some of the other servers in the set.

7. The method as described in claim 1 wherein the hypertext language is Hypertext Markup Language (HTML) and the hypertext reference is an anchor.

8. A method of dynamically generating a Web page at a Web server in response to an HTTP request from a Web client in a computer network, the Web page having a hypertext reference identifying a linked page supported on each of a set of other servers in the computer network, comprising the steps of:
   in response to the request, identifying one of the set of other servers that satisfies a given criteria indicating that the linked page is then available for retrieval from the identified other server;
   inserting into the hypertext reference information identifying a path to the identified other server; and
   returning the Web page including the hypertext reference to the Web client in response to the request such that if the hypertext reference is later activated, the linked page is served from the identified other server.

9. The method as described in claim 8 further including the step of maintaining at the Web server status information about availability of at least some of the other servers in the set.

10. The method as described in claim 9 wherein the given criteria is evaluated against the information about the set of other servers maintained at the Web server.

11. The method as described in claim 8 wherein the identified other server has a then-current access time less than an access time of at least some of the other servers in the set.

12. The method as described in claim 8 wherein the identified other server has a then-current load less than a load of at least some of the other servers in the set.

13. The method as described in claim 8 wherein the identified other server has a then-current availability, based on allocation of the identified other server in the computer network relative to the Web client, that is greater than at least some of the other servers in the set.

14. A computer program product in a computer-readable medium for use in a Web server connectable in a computer network for dynamically generating a Web page in response to a Web client request, the Web page having a hypertext reference identifying a linked object supported on each of a set of other servers in the computer network, the computer program product comprising:
   means responsive to the Web client request for identifying one of the set of other servers that satisfies a given criteria indicating that the linked object is then available for retrieval from the identified other server;
   means for inserting into the hypertext reference information identifying a path to the identified other server; and
   means for returning the Web page including the hypertext reference to the Web client in response to the request such that if the hypertext reference is later activated, the linked object is served from the identified other server.

15. The computer program product as described in claim 14 farther including means for maintaining at the Web server status information about availability of at least some of the other servers in the set.

16. The computer program product as described in claim 15 wherein the identifying means evaluates the given criteria against the information about the set of other servers maintained at the Web server.

17. The computer program product as described in claim 16 wherein the identified other server has a then-current access time less than an access time of at least some of the other servers in the set.

18. The computer program product as described in claim 16 wherein the identified other server has a then-current load less than a load of at least some of the other servers in the set.

19. The computer program product as described in claim 16 wherein the identified other server has a then-current availability, based on a location of the identified other server in the computer network relative to the Web client, that is greater than at least some of the other servers in the set.

20. A computer for use as a Web server in a computer network, comprising:

a processor;

an operating system; and means for dynamically generating a Web page in response to a Web client request, the Web page having a hypertext reference identifying a linked page supported on each of a set of other servers in the computer network, comprising:

means responsive to the Web client request for identifying one of the set of other servers that satisfies a given criteria indicating that the linked page is then available for retrieval from the identified other server;

means for inserting into the hypertext reference information identifying a path to the identified other server; and means for returning the Web page including the hypertext reference to the Web client in response to the request such that if the hypertext reference is later activated, the linked page is served from the identified other server.

21. The computer as described in claim 20 further including means for maintaining information about availability of at least some of the other servers in the set.

22. The computer as described in claim 21 wherein the identifying means evaluates the given criteria against the information about the set of other servers maintained at the Web server.

23. The computer as described in claim 22 wherein the identified other server has a then-current load less than a load of at least some of the other servers in the set.

24. The computer as described in claim 22 wherein the identified other server has a then-current availability, based on a location of the identified other server in the computer network relative to the Web client, that is greater then at least some of the other servers in the set.

25. The computer as described in claim 22 wherein the identified other server has a then-current access time less than an access time of at least some of the other servers in the set.

26. A method of dynamically generating a Web page at a Web server in response to an HTTP request from a Web client in a computer network, the Web page having a set of hypertext references, each hypertext reference identifying a linked page supported on each of a set of other servers in the computer network, comprising the steps of:

in response to the request for the Web page, identifying each of the hypertext references required by the page;

for etch hypertext reference; and identifying one of the set of other servers that satisfies a given criteria indicating that the linked page is then available for retrieval from the identified other server;

inserting into the hypertext reference information identifying a path to the identified other serves; and returning the Web page including the hypertext references to the Web client in response to the request.

27. A Web page having a hypertext reference identifying a linked page supported on each of a set of servers in a computer network, generated by a method comprising the steps of:

in response to a given HTTP request received from a Web client, identifying one of the set of other servers that satisfies a given criteria; and inserting into the hypertext reference information identifying a path to the identified other server such that, when the Web page including the hypertext reference is returned to the Web client in response to the request, the linked page is preferentially served from the identified other server.

28. A method of generating a document formatted according to a hypertext language implemented at a given server in a computer network, the document having a hypertext reference identifying a linked object, comprising the steps of:

maintaining a list of a set of other servers in the computer network on which the linked object is supported;

periodically gathering status information about the set of other servers;

in response to a request from a client for the document, dynamically selecting one of the other servers based on the status information; and inserting into the hypertext reference information identifying a path to the selected other server.

* * * * *

UNITED STATES PATENT AND TRADEMARK OFFICE
CERTIFICATE OF CORRECTION

PATENT NO. : 6,230,196 B1
DATED : May 8, 2001
INVENTOR(S) : Guenthner et al.

It is certified that error appears in the above-identified patent and that said Letters Patent is hereby corrected as shown below:

Column 8, claim 13,
Line 42, please delete "allocation" and insert -- a location --;

Column 10, claim 26,
Line 14, please delete "etch" and insert -- each --;
Line 19, please delete "serves" and insert -- server --.

Signed and Sealed this

Eighth Day of January, 2002

Attest:

Attesting Officer

JAMES E. ROGAN
Director of the United States Patent and Trademark Office